(12) United States Patent
Chang et al.

(10) Patent No.: US 11,555,631 B2
(45) Date of Patent: Jan. 17, 2023

(54) AIR CONDITIONER AND METHOD FOR AIR VOLUME BALANCING

(71) Applicant: Chicony Power Technology Co., Ltd., New Taipei (TW)

(72) Inventors: Tse-Wen Chang, New Taipei (TW); Cheng-Yi Ho, New Taipei (TW); Wen-Yen Cheng, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 283 days.

(21) Appl. No.: 17/013,791

(22) Filed: Sep. 7, 2020

(65) Prior Publication Data
US 2021/0389016 A1 Dec. 16, 2021

(30) Foreign Application Priority Data
Jun. 10, 2020 (TW) .................................. 109119568

(51) Int. Cl.
*F24F 11/80* (2018.01)
*F24F 11/72* (2018.01)
(Continued)

(52) U.S. Cl.
CPC ............ *F24F 13/08* (2013.01); *F24F 1/0018* (2013.01); *F24F 11/72* (2018.01); *F24F 11/80* (2018.01);
(Continued)

(58) Field of Classification Search
CPC .. F24F 13/08; F24F 11/80; F24F 11/72; F24F 1/0018
See application file for complete search history.

(56) References Cited

U.S. PATENT DOCUMENTS 3,977,466 A 8/1976 Johansson
6,308,770 B1 * 10/2001 Shikata ................. F28D 1/0478
165/203
(Continued)

FOREIGN PATENT DOCUMENTS

CN 102889674 A 1/2013
CN 104608590 A 5/2015
(Continued)

OTHER PUBLICATIONS

Office Action dated Jul. 21, 2022 of the corresponding China patent application No. 202010552202.2.
(Continued)

*Primary Examiner* — Nelson J Nieves
(74) *Attorney, Agent, or Firm* — Chun-Ming Shih; HDLS IPR Services

(57) ABSTRACT

An air conditioner at least including a controller, a first fan unit, and a second fan unit arranged parallel to the first fan unit is disclosed. The controller performs a parallel operating control procedure, including a first control mode and a second control mode, to the first fan unit and the second fan unit respectively. When operating under the first control mode, the controller adjusts the rotating speed of one of the first fan unit and the second fan unit based on a first standard air volume, so the two fan units output the air volume equal to or approximate to the first standard air volume. When operating under the second control mode, the controller controls the rotating speed of both the first and second fan units according to a second standard air volume, so the two fan units output the same air volume.

19 Claims, 6 Drawing Sheets

(51) Int. Cl.
    *F24F 13/08*    (2006.01)
    *F24F 1/0018*   (2019.01)
    *F24F 120/20*   (2018.01)
    *F24F 110/40*   (2018.01)
    *F24F 140/10*   (2018.01)

(52) U.S. Cl.
    CPC ....... *F24F 2110/40* (2018.01); *F24F 2120/20* (2018.01); *F24F 2140/10* (2018.01)

(56) References Cited

U.S. PATENT DOCUMENTS

| | | | |
|---|---|---|---|
| 6,948,326 B2 | 9/2005 | Kim et al. | |
| 7,841,381 B2 | 11/2010 | Chagnot et al. | |
| 7,918,407 B2 | 4/2011 | Patch | |
| 2012/0241126 A1* | 9/2012 | Kishi | B60H 1/008 165/42 |
| 2012/0247744 A1* | 10/2012 | Maehata | B60H 1/00828 165/200 |
| 2013/0283840 A1* | 10/2013 | Kakizaki | B60H 1/00064 62/276 |
| 2016/0229266 A1* | 8/2016 | Maeda | B60H 1/00849 |
| 2016/0298636 A1* | 10/2016 | Kim | F24F 1/0033 |
| 2020/0238788 A1* | 7/2020 | Wu | B60H 1/00478 |
| 2021/0086582 A1* | 3/2021 | Hat | B60H 1/00378 |
| 2022/0088994 A1* | 3/2022 | Nurzia | B60H 1/00371 |

FOREIGN PATENT DOCUMENTS

| | | |
|---|---|---|
| CN | 106679019 A | 5/2017 |
| CN | 106704241 A | 5/2017 |
| CN | 108087317 A | 5/2018 |
| CN | 108731199 A | 11/2018 |
| CN | 108981105 A | 12/2018 |
| CN | 109630447 A | 4/2019 |
| CN | 109707431 A | 5/2019 |
| CN | 110293819 A | 10/2019 |
| CN | 111238002 A | 6/2020 |
| GB | 2478779 A | 9/2011 |
| JP | H0763404 A | 3/1995 |
| JP | H10141747 A | 5/1998 |
| JP | H1183125 A | 3/1999 |
| TW | 200923288 A | 6/2009 |
| TW | I328097 B | 8/2010 |

OTHER PUBLICATIONS

Office Action dated Nov. 6, 2020 of the corresponding Taiwan patent application No. 109119568.

\* cited by examiner

AIR CONDITIONER AND METHOD FOR AIR VOLUME BALANCING

BACKGROUND OF THE INVENTION

1. Technical Field

The present invention relates to an air conditioner, and specifically to an air conditioner capable of air volume balancing, and a method using for the same.

2. Description of Related Art

Generally, an air conditioner is usually arranged with one or more fan units on the inside. By controlling the fan units to output a specific air volume, the environment around the air conditioner can reach a target temperature set by the user.

Recently, a new style of air conditioner has been released to the market. This kind of air condition is arranged with multiple parallel fan units in the inside of the air conditioner. As the air conditioner operates, each of the fan units is respectively controlled to output the same air volume, and the sum of the air volume of all the fan units is equal to an air volume required for the environment to reach the target temperature set by the user. Therefore, by substituting a traditional giant fan unit with multiple parallel arranged fan units, hardware costs can be saved, and maintenance for this kind of air conditioner can be easily implemented.

Generally speaking, the housing of the air conditioner is arranged with multiple throttle units, with each of the throttle units respectively corresponding to one inlet, such as an inlet for conducting outdoor air, an inlet for recycling indoor air, etc. Also, each of the throttle units has different opening/closing conditions respectively, so they don't need to be opened or closed simultaneously. As a result, the open/closed status of each of the throttle units will agitate the operation of the multiple fan units arranged behind the throttle units.

In particular, when the multiple fan units are parallelly arranged, the arranged position of each fan unit may correspond to a different throttle unit. Even if the motor of each fan unit is controlled to operate at the same rotating speed, as they are affected by the condition (such as the open status, closed status, and open degree) of the throttle units, each of the fan units may encounter a different resistance. Therefore, even if the motors of the fan units are all rotating at same speed, the output air volume of each of the fan units will be different.

If an air conditioner uses multiple parallelly arranged fan units, but each of the fan unit outputs a different air volume, the total air volume outputted by the entire air conditioner will be uneven. For example, the air volume outputted from an upper side of the outlet of the air conditioner may be stronger than the air volume outputted from a lower side of the outlet of the air conditioner. As a result, when the air conditioner performs a heat exchange procedure through the pipes, the above mentioned uneven air volume will affect the exchanging efficiency of the air conditioner and cause a waste of energy.

SUMMARY OF THE INVENTION

The invention is directed to an air conditioner and a method for an air volume of the air conditioner, which can adjust the rotating speed of the motor of each of the multiple parallelly arranged fan units according to the current resistance of each of the multiple fan units, so as to balance the output air volume of each of the fan units.

In one of the exemplary embodiments of the present invention, the air conditioner at least includes a controller, and a first fan unit and a second fan unit arranged parallel to each other. The controller performs a parallel operating control procedure, including a first control mode and a second control mode to the first fan unit and the second fan unit. When operating under the first control mode, the controller adjusts the rotating speed of either the first fan unit or the second fan unit based on a first standard air volume, so the two fan units output the air volume equal to or approximate to the first standard air volume. When operating under the second control mode, the controller controls the rotating speed of both the first and the second fan unit according to a second standard air volume, so the two fan units output same air volume respectively.

In one of the exemplary embodiments of the present invention, the method for air volume balancing at least includes following steps:

a) determining whether an air conditioner is operating under a first control mode or a second control mode of a parallelly rotating control procedure;

b) regarding either a first air volume currently outputted by a first fan unit or a second air volume currently outputted by a second fan unit as a first standard air volume if the air conditioner is operating under the first control mode;

c) after the step b), adjusting a rotating speed of the first fan unit or the second fan unit according to the first standard air volume for the first fan unit or the second fan unit to output a third air volume, wherein the third air volume is equal to or approximate to the first standard air volume;

d) obtaining a second standard air volume pre-decided to be outputted if the air conditioner is operating under the second control mode;

e) after the step d), calculating a fourth air volume according to the second standard air volume, and controlling the first fan unit and the second fan unit to respectively output the fourth air volume; and f) continually executing the step b) to the step c), or continually executing the step d) to the step e), until the air conditioner is turned off.

In comparison to related art, the present invention ensures that no matter which control mode is applied by the air conditioner (such as a control mode that the total outputted air volume of the air conditioner is known or another control mode that the total outputted air volume of the air conditioner is unknown), the controller of the air conditioner can perform a rotating speed compensation procedure to the multiple fan units in the air conditioner, so as to balance the output air volume of each of the fan units under a condition that the total outputted air volume of the air conditioner can satisfy the requirements of the user.

DETAILED DESCRIPTION OF THE INVENTION

In cooperation with the attached drawings, the technical contents and detailed description of the present invention are described thereinafter according to multiple embodiments, not being used to limit its executing scope. Any equivalent variations and modifications made according to appended claims are covered by the claims claimed by the present invention.

Figure 1:
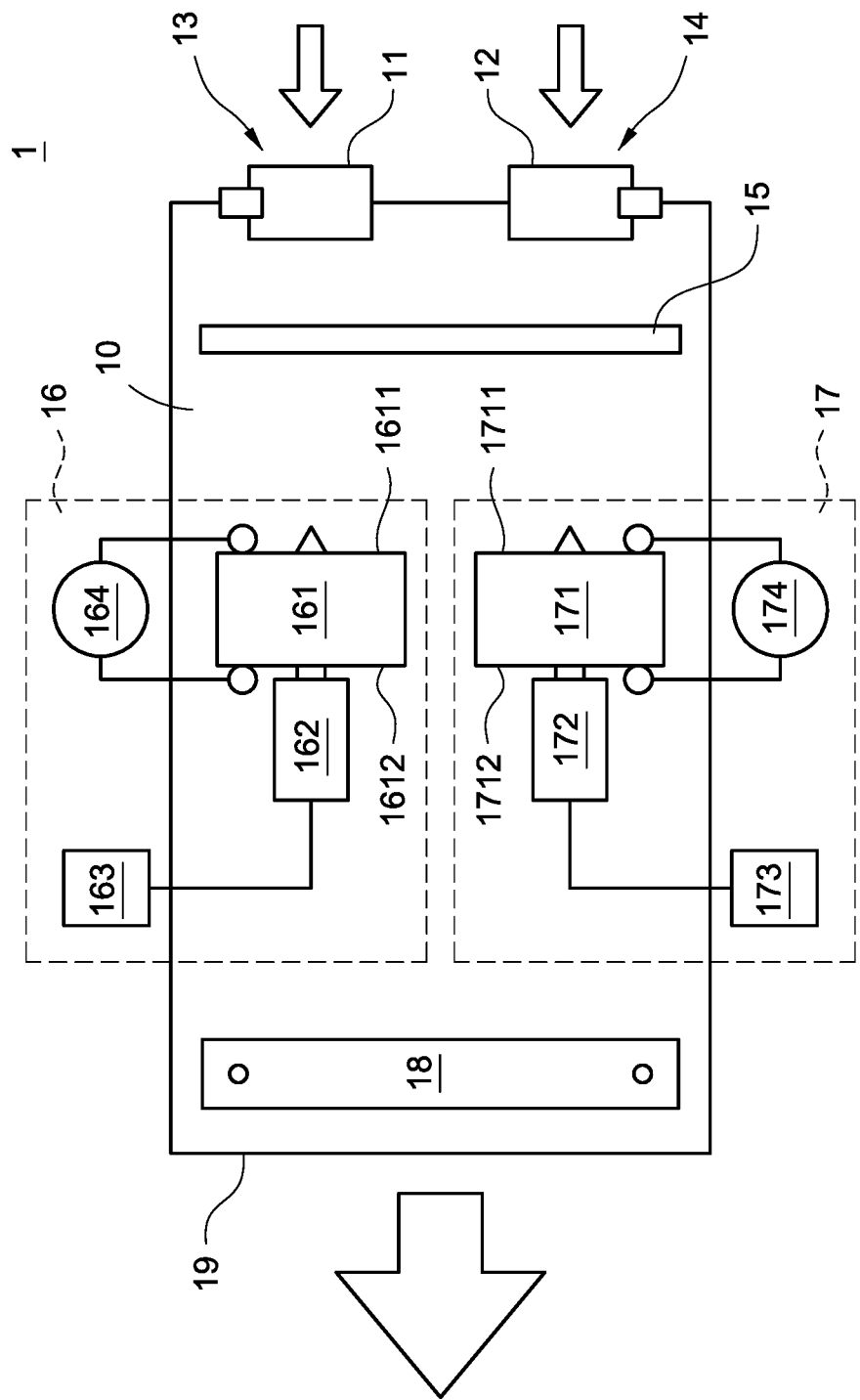
FIG. 1 is a schematic diagram showing an air conditioner of a first embodiment according to the present invention.

FIG. 1 is a schematic diagram showing an air conditioner of a first embodiment according to the present invention. The present invention discloses an air conditioner capable of air volume balancing (referred to as the air conditioner 1 hereinafter). The air conditioner 1 is mainly arranged in an indoor space, and the air conditioner 1 is configured to receive indoor recycling air and/or outdoor air, to filter the air, to heat/cool down the air, and to conduct the air flow back to the indoor environment, so the environment around the air conditioner 1 to reach a target temperature required by the user.

As shown in FIG. 1, the air conditioner 1 includes a housing 10, one side of the housing 10 has multiple inlets, and another side of the housing 10 has at least one outlet 19. For ease of understanding, a first inlet 11 and a second inlet 12 separately arranged at one side of the housing 10 (such as a receiving side) are taken as an example for description in the following, but the number of multiple inlets is not limited at two as disclosed in FIG. 1. In one embodiment, the inlets 11, 12 mentioned above are air inlets, and the at least one outlet 19 mentioned above is an air outlet.

The air conditioner 1 is arranged with multiple throttle units corresponding to the multiple inlets. In the embodiment of FIG. 1, the air conditioner 1 has a first throttle unit 13 arranged corresponding to the position of the first inlet 11, and a second throttle unit 14 arranged corresponding to the position of the second inlet 12. In particular, the first inlet 11 and the second inlet 12 are parallelly arranged, and the first throttle unit 13 and the second throttle unit 14 can be parallelly arranged accordingly, but is not limited thereto.

The first throttle unit 13 and the second throttle unit 14 can be, for example, throttles or baffles for blocking the first inlet 11 and the second inlet 12 from sucking in outside air into the housing 10. When the first throttle unit 13 and/or the second throttle unit 14 is/are closed, the air conditioner 1 is incapable of sucking air into the housing 10 through the first inlet 11 and/or the second inlet 12. On the other hand, when the first throttle unit 13 and/or the second throttle unit 14 is/are opened, the air conditioner 1 can suck in a certain amount of air into the housing 10 through the first inlet 11 and/or the second inlet 12 according to the open degree of the first throttle unit 13 and/or the second throttle unit 14.

Figure 2:
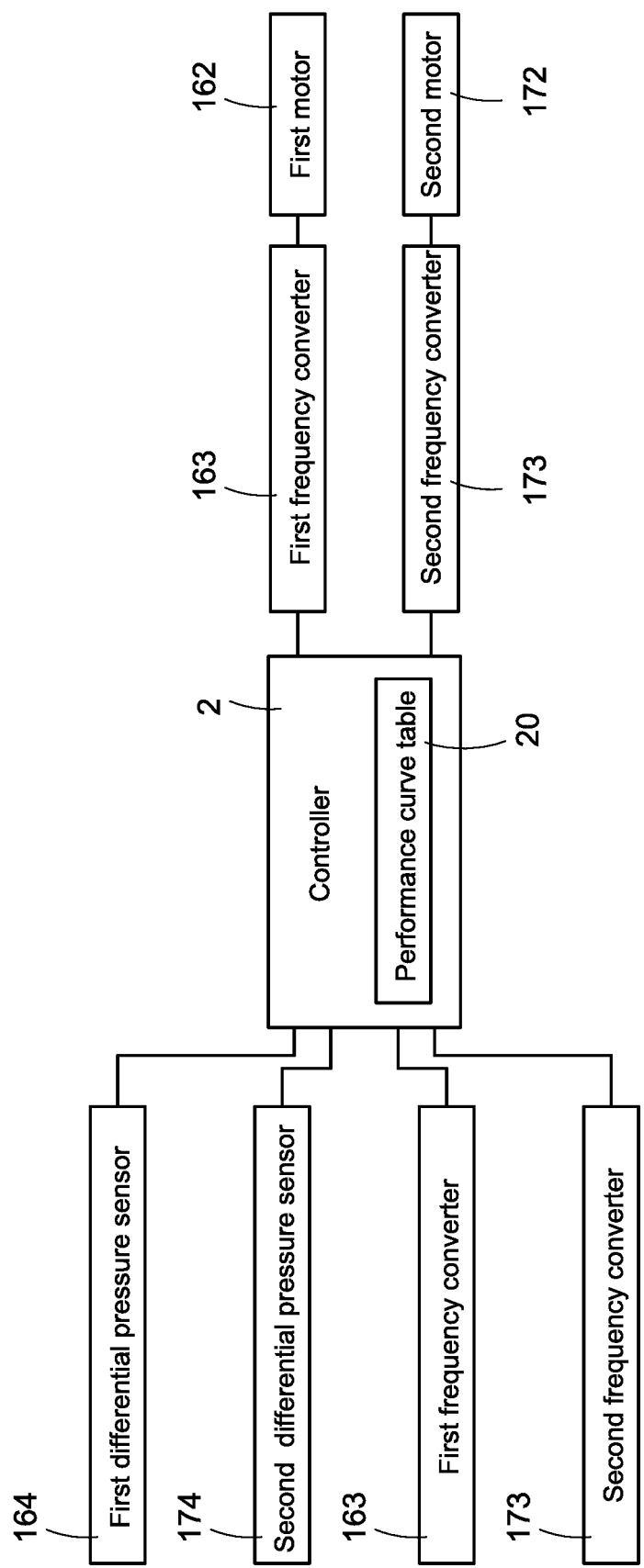
FIG. 2 is a schematic diagram of a controlling structure of a first embodiment according to the present invention.

In particular, the air conditioner 1 includes a controller (such as a controller 2 as shown in FIG. 2) electrically connected to the first throttle unit 13 and the second throttle unit 14. The controller 2 is configured to control the open status, the closed status, and the open degree of the first throttle unit 13 and the second throttle unit 14 respectively according to different conditions. Based on the different conditions, the open status, the closed status, and the open degree of the first throttle unit 13 and the second throttle unit 14 may be the same or be different.

The air conditioner 1 also includes a filter 15 inside the housing 10, and the filter 15 is arranged behind the first throttle unit 13 and the second throttle unit 14. After the first throttle unit 13 and the second throttle unit 14 are opened and the air conditioner 1 starts sucking air into the housing 10 through the first inlet 11 and the second inlet 12, the air in the housing 10 can be filtered by the filter 15.

The air conditioner 1 is also arranged with multiple fan units. In the embodiment of FIG. 1, the air conditioner 1 at least includes a first fan unit 16 located behind the first throttle unit 13 and a second fan unit 17 located behind the second throttle unit 14. In this embodiment, the amount of the multiple fan units corresponds to the amount of multiple throttle units, and the arranged position of each of the fan units corresponds to the arranged position of the each of the throttle units. It should be mentioned that the first fan unit 16 and the second fan unit 17 in this embodiment are parallelly arranged in the housing 10.

In one embodiment, the first fan unit 16 and the second fan unit 17 can be, for example, at least one fan that can rotate for delivering air flow (which can be regarded as a first fan and a second fan).

In another embodiment, however, the amount and the arranged position of the multiple fan units can be unrelated to that of the throttle units. In particular, the amount of multiple fan units can be greater than the amount of multiple throttle units. Alternatively, the amount of multiple throttle units can be greater than the amount of multiple fan units. Additionally, it is unnecessary for the arranged position of each of the fan units to be right behind the arranged position of each of the throttle units. In other words, the amount and the arranged position of the multiple fan units are not limited only to the disclosure of FIG. 1.

In particular, the term "parallelly arranged" mentioned above means one of the multiple fan units is arranged parallel to another one of the multiple fan units, and the total output air volume of the entire air conditioner 1 will be the same as a sum of the output air volume of all of the multiple fan units, which is different from the output result provided by a traditional air conditioner with multiple fan units arranged in series (i.e., multiple fan units arranged front and back). In the embodiment, the first fan unit 16 can output a first air volume after rotating, and the second fan unit 17 can output a second air volume after rotating. A main purpose to be achieved by the present invention is not only to ensure that the total output air volume of the air conditioner 1 can reach a target air volume, but also to balance the first air volume and the second air volume, increasing the operation efficiency of the entire air conditioner 1.

The air conditioner 1 also includes at least one set of heat exchanger 18. The heat exchanger 18 is arranged between the two fan units 16, 17 and the at least one outlet 19. The air conditioner 1 conducts the air flow towards the heat exchanger 18 through the rotation of the first fan unit 16 and the second fan unit 17, and the heat exchanger 18 is operated to heat or to cool down the flowing air. Next, the air conditioner 1 can output the air after being heated or cooled down through the outlet 19, so as to achieve the main purpose of the air conditioner 1 in increasing/decreasing the temperature of the environment around the air conditioner 1.

FIG. 2 is a schematic diagram of a control structure of a first embodiment according to the present invention. As mentioned above, the air conditioner 1 includes the controller 2 which is electrically connected to the first fan unit 16 and the second fan unit 17. The controller 2 in the present invention performs a parallel operating control procedure to the first fan unit 16 and the second fan unit 17, so the entire air conditioner 1 can be ensured to output a target air volume satisfying a requirement of the user, and also balance the output air volume of the first fan unit 16 and the second fan unit 17 at the same time.

In the present invention, the parallel operating control procedure performed by the controller 2 at least includes a first control mode and a second control mode. In one embodiment, the first control mode indicates a passive control mode that controls either the first fan unit 16 or the second fan unit 17 based on a first standard air volume, and the second control mode indicates an active control mode that simultaneously controls the first fan unit 16 and the second fan unit 17 based on a second standard air volume, but is not limited thereto.

In particular, the first control mode (i.e., the passive control mode) means that the motor speed of the first fan unit 16 and the second fan unit 17 is continually adjusted, under the situation that the controller 2 only knows a target temperature but doesn't know a total air volume required to be outputted by the entire air conditioner 1, to ensure that the entire air conditioner finally outputs a total air volume that can make the environment achieve the target temperature. The second control mode (i.e., the active control mode) means that the controller 2 knows the total air volume required to be outputted by the entire air conditioner 1, and the controller 2 respectively controls the rotation of the first fan unit 16 and the second fan unit 17 to ensure that a sum of the output air volume of the first fan unit 16 and the second fan unit 17 can achieve the total outputted air volume needed by the entire air conditioner 1.

More specifically, when the air conditioner 1 operates under the first control mode, the total air volume required to be outputted by the entire air conditioner 1 in unknown. In this scenario, the controller 2 first sets a first standard air volume based on the operation parameters of the first fan unit 16 and the second fan unit 17, and adjusts the motor speed of the first fan unit 16 and the second fan unit 17 according to the first standard air volume so the adjusted first fan unit 16 or the adjusted second fan unit 17 can output a third air volume. In this embodiment, the third air volume is equal to or approximate to the first standard air volume set by the controller 2.

When the air conditioner 1 operates under the second control mode, the total air volume required to be outputted by the entire air conditioner 1 is known. In this scenario, the controller 2 directly regards the known total air volume as a second standard air volume, and calculates a fourth air volume according to the second standard air volume. Next, the controller 2 controls the motor speed of the first fan unit 16 and the second fan unit 17 so the first fan unit 16 and the second fan unit 17 output same air volume (which is the fourth air volume). In one embodiment, the fourth air volume is calculated by dividing the second standard air volume by the amount of the multiple fan units parallel arranged in the air conditioner 1, but is not limited thereto. In this embodiment, the amount of multiple fan units parallel arranged in the air conditioner 1 is two, wherein the first fan unit 16 is controlled to output the fourth air volume and the second fan unit 17 is also controlled to output the fourth air volume. In other words, the fourth air volume is half of the second standard air volume.

However, the above descriptions are only a part of the exemplary embodiments, and are not intended to limit the scope of the present invention.

As disclosed in FIG. 1, the first fan unit 16 in the present invention includes a first impeller 161, a first motor 162 used to drive the first impeller 161 to rotate and deliver the first air volume, a first frequency converter 163 electrically connected to the first motor 162 for controlling the rotating speed of the first motor 162, and a first differential pressure sensor 164. Two ends of the first differential pressure sensor 164 are respectively arranged at a first intake side 1611 and a first outtake side 1612 of the first impeller 161, which is used to sense a first air-pressure difference between the two sides 1611, 1612 of the first impeller 161.

In particular, the first differential pressure sensor 164 senses an air pressure value at the first intake side 1611 of the first impeller 161 through an end-point thereon, senses another air pressure value at the first outtake side 1612 of the first impeller 161 through another end-point thereon, and then calculates the first air-pressure difference of the first fan unit 16 according to the two air pressure values, wherein the first air-pressure difference is proportional to the resistance currently encountered by the first fan unit 16. Additionally, the first air-pressure difference is inversely proportional to the first air volume currently outputted by the first fan unit 16.

Similarly to the first fan unit 16 discussed above, the second fan unit 17 includes a second impeller 171, a second motor 172 used to drive the second impeller 171 to rotate and deliver the second air volume, a second frequency converter 173 electrically connected to the second motor 172 for controlling the rotating speed of the second motor 172, and a second differential pressure sensor 174. Two ends of the second differential pressure sensor 174 are respectively arranged at a second intake side 1711 and a second outtake side 1712 of the second impeller 171, which is used to sense a second air-pressure difference between the two sides 1711, 1712 of the second impeller 161.

In particular, the second differential pressure sensor 174 senses an air pressure value at the second intake side 1711 of the second impeller 171 through an end-point thereon, senses another air pressure value at the second outtake side 1712 of the second impeller 171 through another end-point thereon, and then calculates the second air-pressure difference of the second fan unit 17 according to the two air pressure values, wherein the second air-pressure difference is proportional to the resistance currently encountered by the second fan unit 17. Additionally, the second air-pressure difference is inversely proportional to the second air volume currently outputted by the second fan unit 17.

It should be mentioned that the air conditioner 1 in the present invention is arranged with multiple fan units inside the housing 10, each of the multiple fan units i have an individual frequency converter as well as an individual motor, and each of the frequency converters can output the same or different speed commands to the corresponding motor according to the control of the controller 2. The parallel operating control procedure performed by the controller 2 in the present invention is different from the technical solution provided by a traditional air conditioner which uses one single frequency converter to control all of the fan units simultaneously, so multiple fan units of the air conditioner 1 in the present invention can operate according to different motor speeds. As a result, the controller 2 can adjust the output air volume of each of the multiple fan units, so as to achieve the purpose of balancing the output air volume.

In the embodiment, the first frequency converter 163 is electrically connected to the first motor 162, and the first frequency converter 163 outputs an operation command to the first motor 162 according to the control of the controller 2, so the first motor 162 can rotate at a corresponding speed and drive the first impeller 161 to rotate to deliver the first air volume. Also, the first frequency converter 163 continually monitors the first motor 162 to retrieve a current rotating speed of the first motor 162 (which is referred to as a first rotating speed). Similarly, the second frequency converter 173 is electrically connected to the second motor 172, and the second frequency converter 173 outputs an operation command to the second motor 172 according to the control of the controller 2, so the second motor 172 can rotate at a corresponding speed and drives the second impeller 171 to rotate and deliver the second air volume. Also, the second frequency converter 173 continually monitors the second motor 172 to retrieve a current rotating speed of the second motor 172 (which is referred to as a second rotating speed).

As disclosed in FIG. 2, the controller 2 is electrically connected to the first differential pressure sensor 164, the second differential pressure sensor 174, the first frequency converter 163, and the second frequency converter 173. The controller 2 obtains the first air-pressure difference, the second air-pressure, the first rotating speed, and the second rotating speed from the first differential pressure sensor 164, the second differential pressure sensor 174, the first frequency converter 163, and the second frequency converter 173 respectively, and the controller 2 performs the parallel operating control procedure to the first fan unit 16 and the second fan unit 17 according to the above data.

In one embodiment, the controller 2 in the present invention can be, for example but not limited to, a processor, a micro control unit (MCU), system on a chip (SoC), or a programmable logic controller (PLC), etc. The controller 2 communicates with the first differential pressure sensor 164 and the second differential pressure sensor 174 through RS-232 interface ports, and communicates with the first frequency converter 163 and the second frequency converter 173 through RS-485 interface ports. However, the above descriptions are only a part of the exemplary embodiments, and are not intended to narrow down the scope of the present invention.

The controller 2 is configured to store a performance curve table 20 of the air conditioner 1. The performance curve table 20 records corresponding curves among different air pressures, rotating speeds, and air volumes. As mentioned above, the controller 2 can obtain the first air-pressure difference and the first rotating speed of the first fan unit 16 from the first differential pressure sensor 164 and the first frequency converter 163, and can obtain the second air-pressure difference and the second rotating speed of the second fan unit 17 from the second differential pressure sensor 174 and the second frequency converter 173. Therefore, the controller 2 can reference the performance curve table 20 according to the first air-pressure difference and the first rotating speed for obtaining the first air volume currently outputted by the first fan unit 16. Also, the controller 2 can inquire the performance curve table 20 according to the second air-pressure difference and the second rotating speed to obtain the second air volume currently outputted by the second fan unit 17.

It should be mentioned that as the corresponding curves among the air pressures, the rotating speeds, and the air volumes are related to the performance of the air conditioner 1 itself, and are experimented with and written in the performance curve table 20, they cannot be changed arbitrarily. In one embodiment, a manufacturer of the air conditioner 1 can pre-write the performance curve table 20 to the controller 2 when producing the air conditioner 1. In another embodiment, a user can perform a test to the air conditioner 1 to obtain the relationship between different air pressures, rotating speeds, and air volumes of the air conditioner 1, and generate the corresponding curves and write the performance curve table 20 to the controller 2 or other storage (not shown) according to the test results, not limited thereto.

Figure 3:
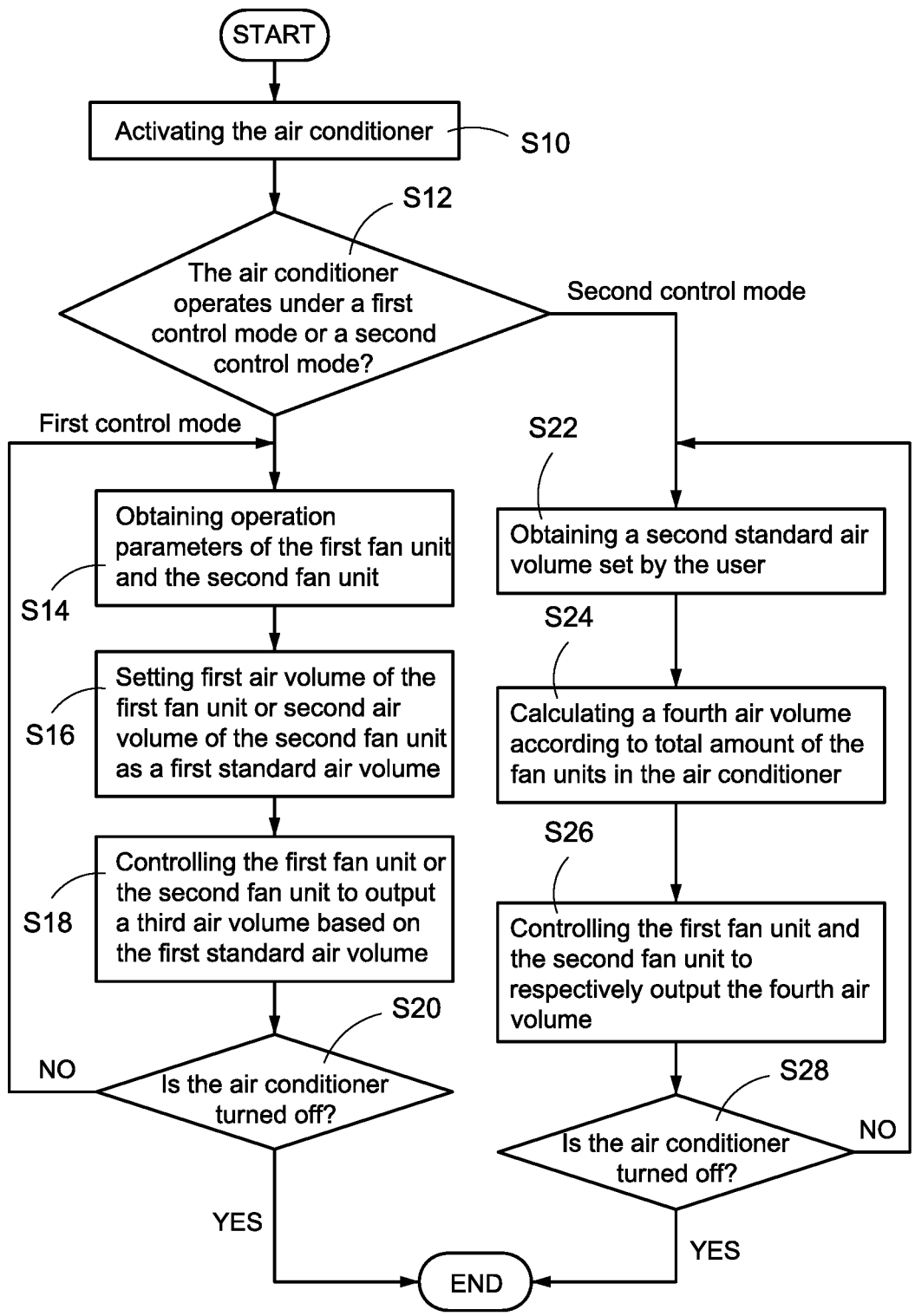
FIG. 3 is a balancing flowchart of a first embodiment according to the present invention.

FIG. 3 is a balancing flowchart of a first embodiment according to the present invention. The present invention further discloses a method for air volume balancing (referred to as a balancing method), and the balancing method is mainly applied by the air conditioner 1 as disclosed in FIG. 1 and FIG. 2.

First, a user activates the air conditioner 1 when they need to adjust the temperature of the environment around them (step S10). After the air conditioner 1 has been activated, the controller 2 of the air conditioner 1 determines which control mode, including the first control mode (i.e., the passive control mode) and the second control mode (i.e., the active control mode) of the parallel operating control procedure, is adopted currently by the air conditioner 1 (step S12), and the controller 2 performs different control manners to the first fan unit 16 and the second fan unit 17 according to the result of the determination, i.e., according to which whether the air conditioner 1 is operating under the first control mode or the second control mode.

It should be mentioned that the controller 2 in the step S12 determines whether a command sent by the user is a command for indicating a target temperature or a command for indicating a target air volume. If the command of the user asks the entire air conditioner 1 to arbitrarily output an air volume in order for the environment reach a target temperature, the controller 2 needs to operate under the first control mode. On the other hand, if the command of the user asks the entire air conditioner 1 to directly output a specific target air volume, the controller 2 needs to operate under the second control mode.

If the controller 2 determines, in the step S12, that the air conditioner 1 currently operates under the first control mode, the controller 2 monitors the operation parameters of the first fan unit 16 and the second fan unit 17 through the first frequency converter 163 and the second frequency converter 173 (step S14), and sets either the first air volume currently outputted by the first fan unit 16 or the second air volume currently outputted by the second fan unit 17 as a first standard air volume that the first control mode requires to apply (step S16). Next, the controller 2, based on the first standard air volume, controls the first fan unit 16 to change its operation parameters and to output a third air volume which is same as or approximate to the first standard air volume, or controls the second fan unit 17 to change its operation parameters and to output the third air volume which is same as or approximate to the first standard air volume (step S18).

If the first air volume of the first fan unit 16 has been set as the first standard air volume, the controller 2 in the step S18 controls the second frequency converter 173 of the second fan unit 17 to increase a second rotating speed of the second motor 172 in order for the second fan unit 17 to change from outputting the second air volume to output the aforementioned third air volume. If the second air volume of the second fan unit 17 has been set as the first standard air volume, the controller 2 in the step S18 controls the first frequency converter 163 of the first fan unit 16 to increase a first rotating speed of the first motor 162 in order for the first fan unit 16 to change from outputting the first air volume to output the aforementioned third air volume.

More specifically, if the first air volume has been set as the first standard air volume, the controller 2 references the performance curve table 20 according to the first standard air volume and the second air-pressure difference of the second fan unit 17 to obtain a second rotating speed which is capable for the second fan unit 17 to output the third air volume. Therefore, the controller 2 can control the second motor 172 to rotate at the obtained second rotating speed through the second frequency converter 173, and the second fan unit 17 can then output the third air volume which is the same as or approximate to the first standard air volume. In other words, the second fan unit 17 can output a certain air volume equal to the first air volume currently outputted by the first fan unit 16.

Similarly, if the second air volume has been set as the first standard air volume, the controller 2 references the performance curve table 20 according to the first standard air volume and the first air-pressure difference of the first fan unit 16 to obtain a first rotating speed which is capable for the first fan unit 16 to output the third air volume. Therefore, the controller 2 can control the first motor 162 to rotate at the obtained first rotating speed through the first frequency converter 163, and the first fan unit 16 can then output the third air volume which is the same as or approximate to the first standard air volume. In other words, the first fan unit 16 can output a certain air volume equal to the second air volume currently outputted by the second fan unit 17.

It should be mentioned that the controller 2 in step S16 regards either the first fan unit 16 or the second fan unit 17 as having a relatively small air-pressure difference (i.e., outputting a larger air volume relatively) as a compensating standard fan unit, and the controller 2 may set the air volume currently outputted by the compensating standard fan unit as the first standard air volume.

For example, if the first air-pressure difference of the first fan unit 16 is smaller than the second air-pressure different of the second fan unit 17 (i.e., the first air volume currently outputted by the first fan unit 16 is larger than the second air volume currently outputted by the second fan unit 17), the controller 2 in the step S16 will set the first air volume as the first standard air volume. In this embodiment, the controller 2, in step S18, will control the second frequency converter 173 according to the first standard air volume to increase the rotating speed of the second motor 172 so that the second fan unit 17 can output the third air volume. When the first fan unit 16 outputs the first air volume and the second fan unit 17 outputs the third air volume, the output air volumes of the first fan unit 16 and the second fan unit 17 are balanced.

As another example, if the second air-pressure difference of the second fan unit 17 is smaller than the first air-pressure different of the first fan unit 16 (i.e., the second air volume currently outputted by the second fan unit 17 is larger than the first air volume currently outputted by the first fan unit 16), the controller 2 in the step S16 will set the second air volume as the first standard air volume. In this embodiment, the controller 2, in step S18, will control the first frequency converter 163 according to the first standard air volume to increase the rotating speed of the first motor 162 so that the first fan unit 16 can output the third air volume. When the first fan unit 16 outputs the third air volume and the second fan unit 17 outputs the second air volume, the output air volumes of the first fan unit 16 and the second fan unit 17 are balanced.

By using the above disclosed technical solutions, the controller 2 can compensate for a fan unit which currently outputs a smaller air volume, increase the air volume outputted by this fan unit, and allow the air volumes outputted by the two fan units 16, 17 to reach a balance. However, when any one of the fan units is compensated for increasing its air volume, it may cause the total outputted air volume of the entire air conditioner 1 to exceed a required air volume (i.e., the temperature of the environment may no longer satisfy the target temperature set by the user). In one embodiment, the controller 2 receives sense data from an external temperature sensor (not shown), and simultaneously adjusts the output air volumes of both of the two fan units 16, 17 according to the sense data, wherein the sense data indicates if the current temperature of the environment is too high or too low. As a result, the total output of the entire air conditioner 1 can still satisfy the user's requirement after balancing the outputs of the two fan units 16, 17.

As mentioned above, the technical solution provided by the present invention regards a fan unit with a larger outputted air volume as a compensating standard fan unit, which compensates the rotating speed of another fan unit with a smaller outputted air volume according to the compensating standard fan unit. By compensating the rotating speed of a weak fan unit, the multiple fan units in the air conditioner 1 can respectively output the same or approximate air volume, therefore, the purpose of the present invention to balance the outputted air volumes of all the fan units in the housing 10 can be effectively achieved.

It should be mentioned that, following the variation of the open status, the closed status, and the open degree of the first throttle unit 13 and the second throttle unit 14, the resistance encountered by the first fan unit 16 and the second fan unit 17 may be varied as well, resulting in changing the first air volume the first fan unit 16 can output and the second air volume the second fan unit 17 can output. In this embodiment, the controller 2 continually determines whether the air conditioner 1 is turned off or not (step S20), and continually re-executes the above step S14 to step S18 before the air conditioner 1 is turned off. According to the execution of the step loop, the controller 2 can dynamically decide to set the first standard air volume according to the first fan unit 16 or the second fan unit 17. In other words, the first standard air volume applied by the controller 2 under the first control mode is not an unchangeable standard, and the first standard air volume will be dynamically adjusted according to the variation of the first air volume of the first fan unit 16 and the second air volume of the second fan unit 17.

Please refer back to FIG. 3. If the controller 2 determines, in the step S12, that the air conditioner 1 operates currently under the second control mode, the controller 2 first obtains a second standard air volume which may be directly set by the user (step S22). Next, the controller 2 calculates a fourth air volume according to the total amount of the fan units arranged in the air conditioner 1 (step S24). Then, the controller 2 controls the first fan unit 16 and the second fan unit 17 (i.e., controls all the fan units in the air conditioner 1) to output same air volume which is the fourth air volume (step S26).

In particular, the controller 2 in step S24 divides the second standard air volume by the total amount of the fan units to obtain the fourth air volume that each of the fan units needs to output. For example, the air conditioner 1 in the present embodiment has two fan units including the first fan unit 16 and the second fan unit 17, so the fourth air volume in this embodiment will be a half of the second standard air volume (i.e., dividing the second standard air volume by two).

It should be mentioned that, in step S26, the controller 2 controls the first frequency converter 163 to adjust a first rotating speed of the first motor 162 for the first fan unit 16 to output the fourth air volume calculated from the step S24. Also, the controller 2 simultaneously controls the second frequency converter 173 to adjust a second rotating speed of the second motor 172 for the second fan unit 17 to output the fourth air volume as outputted by the first fan unit 16. In this embodiment, a sum of the outputted air volumes of the first fan unit 16 and the second fan unit 17 will be equal to or approximate to the second standard air volume obtained in the step S22.

As mentioned above, the controller 2 is configured to store a performance curve table 20 exclusively belonging to the air conditioner 1. After the fourth air volume has been calculated in the step S24, the controller 2 can reference the performance curve table 20 according to the first air-pressure difference of the first fan unit 16 and the fourth air volume to obtain a first rotating speed which can make the first fan unit 16 to output the fourth air volume. More specifically, the controller 2 can control the first motor 162 to rotate at the obtained first rotating speed by the first frequency converter 163 in step S26, so the first fan unit 16 can be ensured to output the fourth air volume. Similarly, the controller 2 can reference the performance curve table 20 according to the second air-pressure difference of the second fan unit 17 and the fourth air volume to obtain a second rotating speed which can make the second fan unit 17 to output the fourth air volume. Then, the controller 2 can control the second motor 172 to rotate at the obtained second rotating speed by the second frequency converter 173 in the step S26, so the second fan unit 17 can be ensured to output the fourth air volume.

By using the above technical solution, the controller 2 can ensure the fourth air volume is simultaneously outputted by either the first fan unit 16 and the second fan unit 17. As a result, the main purpose of balancing the output air volumes can be achieved, and the total output air volume provided by the entire air conditioner 1 can satisfy the second standard air volume previously requested by the user.

According to the variation of the environment temperature, the user may request the air conditioner 1 to provide a different air volume. In this embodiment, the controller 2 continually determines whether the air conditioner 1 is turned off or not (step S28), and continually re-executes step S22 to step S26 before the air conditioner 1 is turned off. According to the execution of the step loop, the controller 2 can dynamically adjust the second standard air volume according to the actual requirement of the user, and adjusts the output air volumes of the first fan unit 16 and the second fan unit 17 correspondingly. Therefore, the output air volumes of the first fan unit 16 and the second fan unit 17 can be kept in balance.

Figure 4:
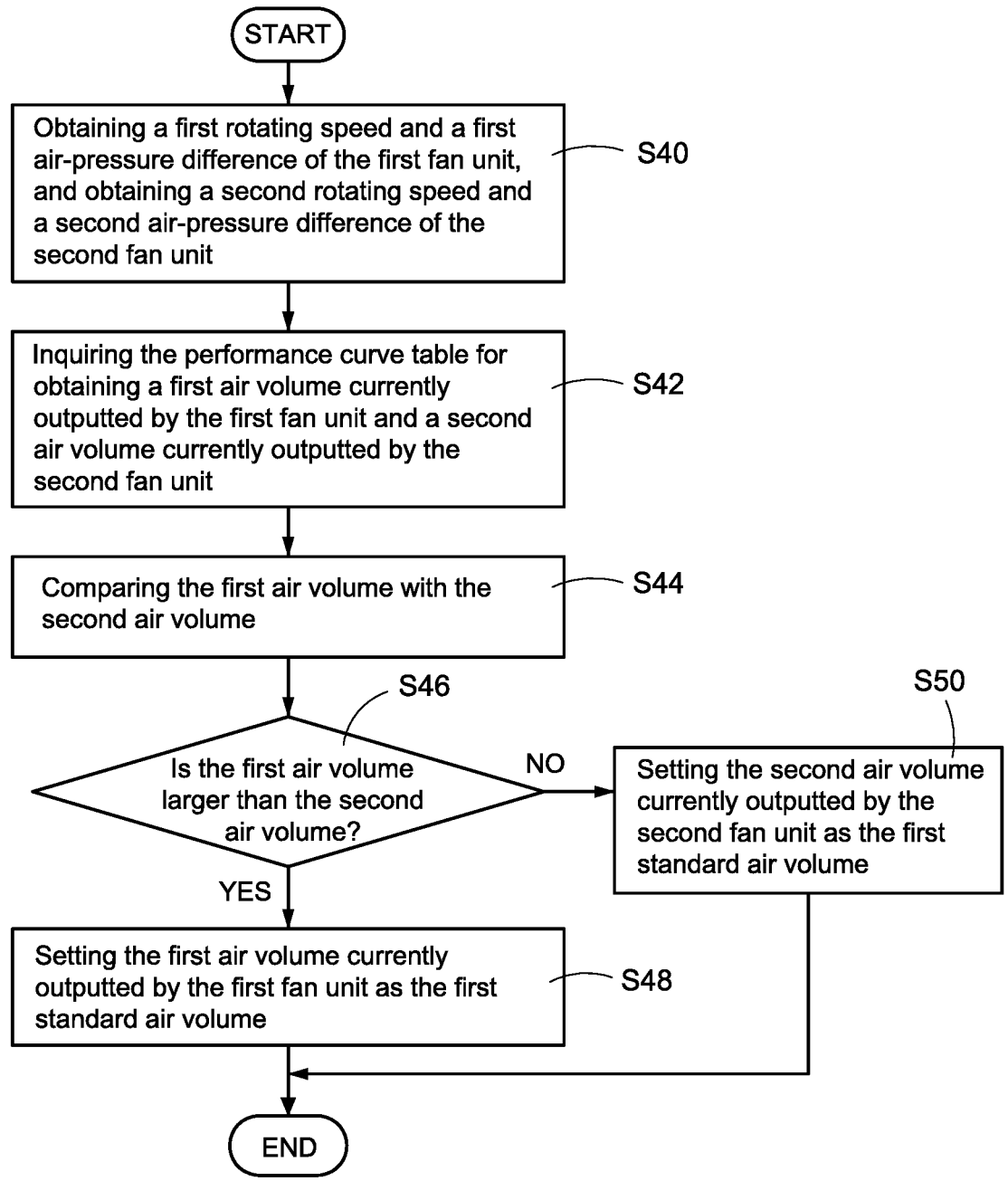
FIG. 4 is a flowchart for obtaining a standard air volume of a first embodiment according to the present invention.

FIG. 4 is a flowchart for obtaining a standard air volume of a first embodiment according to the present invention. FIG. 4 is applied to describe the step S16 discussed according to FIG. 3 in detail.

As shown in FIG. 4, when determining that the air conditioner 1 needs to operate under the first control mode, the controller 2 first obtains a current first rotating speed and first air-pressure difference of the first fan unit 16 through the first frequency converter 163 and the first differential pressure sensor 164, and the controller 2 obtains a current second rotating speed and second air-pressure difference of the second fan unit 17 through the second frequency converter 173 and the second differential pressure sensor 174 (step S40). Next, the controller 2 references the performance curve table 20 belonging to the air conditioner 1 according to the first air-pressure difference and the first rotating speed to obtain a first air volume currently outputted by the first fan unit 16, and also references the performance curve table 20 according to the second air-pressure difference and the second rotating speed to obtain a second air volume currently outputted by the second fan unit 17 (step S42).

After respectively obtaining the first air volume of the first fan unit 16 and the second air volume of the second fan unit 17, the controller 2 then compares the first air volume with the second air volume (step S44), and determines whether the first air volume is larger than the second air volume (step S46).

If the first air volume is larger than the second air volume, the controller 2 directly sets the first air volume currently outputted by the first fan unit 16 as the first standard air volume (step S48). In this embodiment, the controller 2 increases the outputted air volume of the second fan unit 17 according to the first standard air volume (which is the first air volume of the first fan unit 16), so as to balance the outputted air volumes of the two fan units 16, 17.

If the first air volume is determined to be not larger than the second air volume (for example, the first air volume is smaller than the second air volume), the controller 2 then sets the second air volume currently outputted by the second fan unit 17 as the first standard air volume (step S50). In this embodiment, the controller 2 increases the outputted air volume of the first fan unit 16 according to the first standard air volume (which is the second air volume of the second fan unit 17), so as to balance the outputted air volumes of the two fan units 16, 17.

It should be mentioned that while the technical solution discussed above is applied for balancing the outputs of the first fan unit 16 and the second fan unit 17, if the controller 2 determines that the first air volume is equal to or extremely approximate to the second air volume in the step S46, it means the outputs of the two fan units 16, 17 are already in balance. In this scenario, the controller 2 doesn't need to compensate the air volume any of the fan units, and neither the step S48 nor the step S50 needs to be executed by the controller 2.

Figure 6:
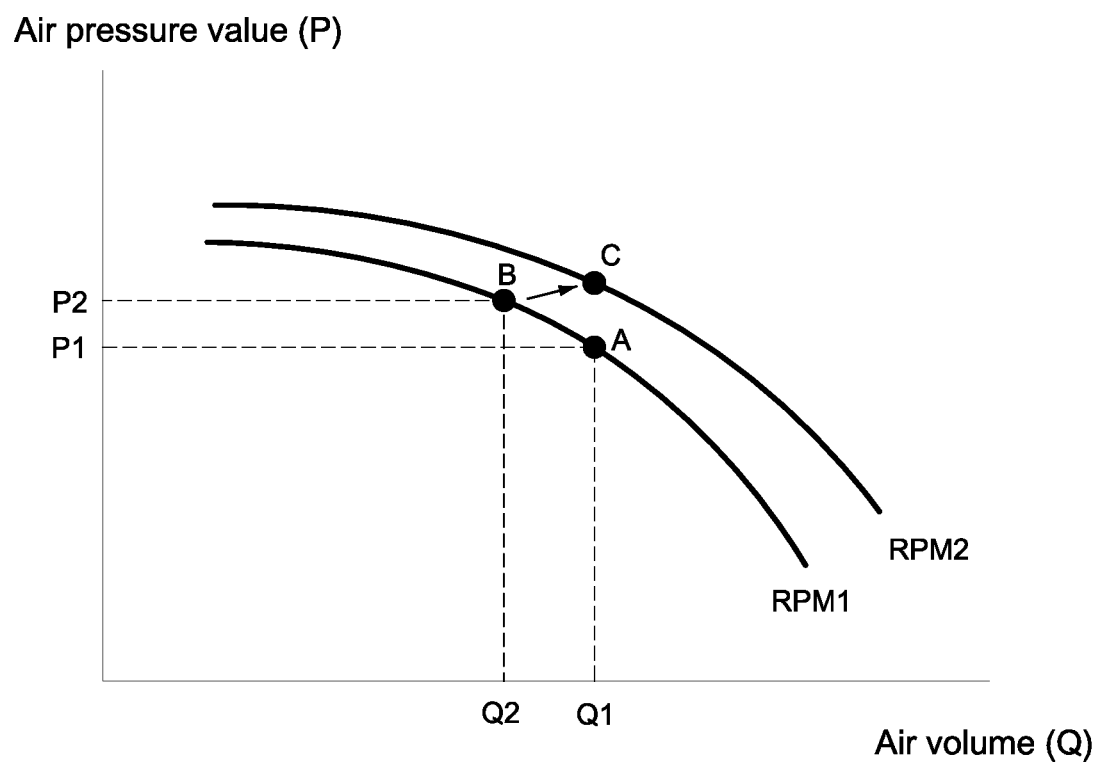
FIG. 6 is a schematic diagram showing performance curves of a first embodiment according to the present invention.

Please refer to FIG. 6 with FIG. 4, wherein FIG. 6 is a schematic diagram showing performance curves of a first embodiment according to the present invention. FIG. 6 is used to describe in detail, in company with the performance curve table 20 of the air conditioner 1, how to implement the rotating speed compensation procedure to the first fan unit 16 and the second fan unit 17 under the first control mode.

In the disclosure of FIG. 6, the first fan unit 16 has a first air-pressure difference P1, the second fan unit 17 has a second air-pressure difference P2, and the controller 2 controls both the first motor 162 and the second motor 172 to rotate at a first rotating speed RPM1. In this embodiment, the first fan unit 16 outputs a first air volume Q1, and the second fan unit 17 outputs a second air volume Q2.

After the first fan unit 16 and the second fan unit 17 is in operation, the controller 2 can obtain the first air-pressure difference P1 and the second air-pressure difference P2 from the first differential pressure sensor 164 and the second differential pressure sensor 172 respectively. By referencing the performance curve table 20, the controller 2 can further calculate the first air volume Q1 and the second air volume Q2. More specifically, the performance curve table 20 can record the following formulas at least including:

$$Q_1 = C_1 + C_2 * P_1 + C_3 * P_1 * P_1;$$

$$Q_2 = C_1 + C_2 * P_2 + C_3 * P_2 * P_2;$$

C1, C2, and C3 in the above formulas are linear regression coefficients known by experimentation. In particular, the performance curve table 20 records multiple formulas which use different linear regression coefficients according to different motor speeds. Once the controller 2 obtains a corresponding formula from the performance curve table 20 according to the current motor speed of a certain fan unit, and inputs the current air-pressure difference of this fan unit into the obtained formula, the controller 2 can directly calculate a corresponding air volume that this fan unit can output.

According to the fan affinity law, the air volume outputted by a certain fan unit and the rotating speed applied by the same fan unit can be found by a linear equation. After the controller 2 sets a larger air volume (such as the first air volume Q1) as the first standard air volume, the controller 2 can then calculate a second rotating speed RPM2 which can make the second fan unit 17 to output a third air volume according to the following equation, wherein the third air volume is equal to or approximate to the first standard air volume:

$$\frac{Q_1}{Q_2} = \frac{RPM_1}{RPM_2}$$

As disclosed in FIG. 6, the second fan unit 17 has a second air-pressure difference P2, and the second motor 172 originally applies a first rotating speed RPM1 same as the first fan unit 16, so the second fan unit 17 originally outputs a second air volume Q2. However, the second air volume Q2 is smaller than the first air volume Q2 currently outputted by the first fan unit 16 in the embodiment, causing the outputted air volume of the entire air conditioner 1 to be uneven.

As mentioned above, after setting the first air volume Q1 of the first fan unit 16 as the first standard air volume, the controller 2 can calculate the second rotating speed RPM2 based on the above formula. When performing the rotating speed compensation procedure to the second fan unit 17, the controller 2 increases the rotating speed of the second motor 172 to the calculated second rotating speed RPM2, which ensures that the second fan unit 17 outputs a certain air volume same as or approximate to the air volume currently outputted by the first fan unit 16. Therefore, the uneven air volume provided by the entire air conditioner 1 can be effectively solved.

It should be mentioned that if the environmental factors change (for example the status of the first throttle unit 13 and/or the second throttle unit 14 changes) and causes the second air volume Q2 to be larger than the first air volume Q1, the controller 2 can also apply the above technical solution to perform the rotating speed compensation procedure to the first fan unit 16, so as to keep the output air volumes of the first fan unit 16 and the second fan unit 17 in balance.

Figure 5:
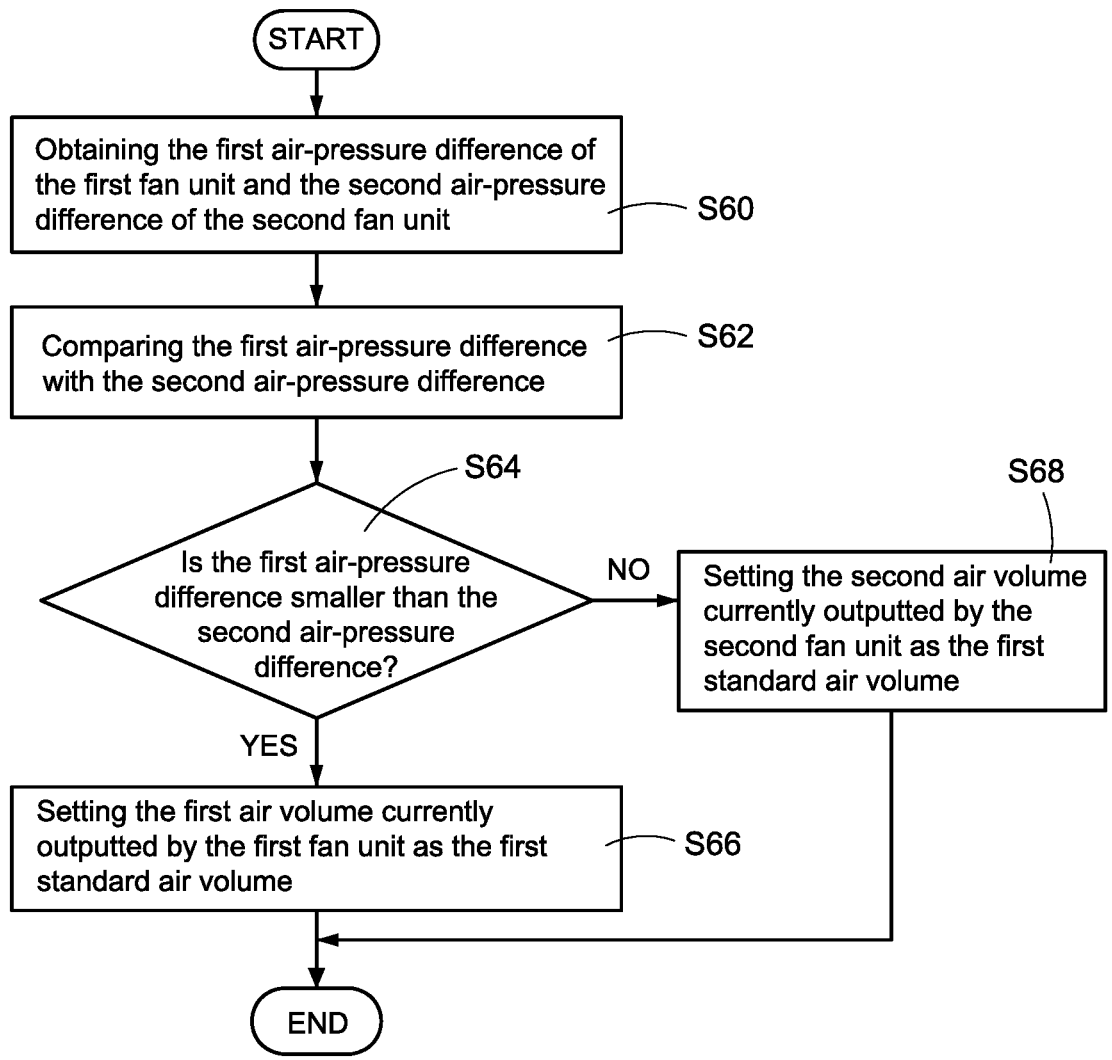
FIG. 5 is a flowchart for obtaining a standard air volume of a second embodiment according to the present invention.

FIG. 5 is a flowchart for obtaining a standard air volume of a second embodiment according to the present invention. FIG. 5 discloses another embodiment with respect to step S16 discussed in FIG. 3.

As shown in FIG. 5, after determining that the air conditioner 1 operates under the first control mode, the controller 2 first obtains the first air-pressure difference of the first fan unit 16 through the first differential pressure sensor 164, and obtains the second air-pressure difference of the second fan unit 17 through the second differential pressure sensor 174 (step S60).

As discussed above, the air-pressure difference of a fan unit is inversely proportional to the output air volume of the same fan unit. In other words, if a fan unit has a larger air-pressure difference, it means the fan unit will encounter a larger resistance and can output a smaller air volume relatively, and vice versa. As a result, the controller 2 can directly compare the first air-pressure difference with the second air-pressure difference without calculating the first air volume currently outputted by the first fan unit 16 and the second air volume currently outputted by the second fan unit 17 (step S62), and the controller 2 can then determine whether the first air-pressure difference is smaller than the second air-pressure difference (step S64).

If the first air-pressure difference is determined to be smaller than the second air-pressure difference, it means the first air volume currently outputted by the first fan unit 16 is larger than the second air volume currently outputted by the second fan unit 17. In this scenario, the controller 2 directly sets the first air volume currently outputted by the first fan unit 16 as the first standard air volume (step S66). It should be mentioned that after step S64, the controller 2 can reference the performance curve table 20 through the above-mentioned technical solution for obtaining the first air volume (as well as the second air volume). Therefore, the controller 2 can set the first standard air volume based on the first air volume in the step S66, and increase the outputted air volume of the second fan unit 17 according to the first standard air volume to balance the outputs of the two fan units 16, 17.

If the first air-pressure difference is determined to be larger than the second air-pressure difference, it means the second air volume currently outputted by the second fan unit 17 is larger than the first air volume currently outputted by the first fan unit 16. In this scenario, the controller 2 directly sets the second air volume currently outputted by the second fan unit 17 as the first standard air volume (step S68). In this embodiment, the controller 2 increases the outputted air volume of the first fan unit 16 according to the first standard air volume to balance the outputs of the two fan units 16, 17.

As described above, if the first air-pressure difference is determined in step S64 as the same as or extremely approximate to the second air-pressure difference, it means the outputs of the two fan units 16, 17 have already been balanced. In this scenario, the controller 2 doesn't have to compensate the rotating speed of any of the fan units 16, 17, so neither step S66 nor step S68 has to be executed.

By way of the above technical solutions provided by the present invention, no matter whether an active control mode or a passive control mode is applied by the air conditioner 1, the air conditioner 1 can compensate the rotating speed of the multiple fan units inside the air conditioner 1 through the controller 2 in real time. Therefore, not only can the total output air volume of the entire air conditioner 1 be ensured to satisfy the user's requirement, the individual air volumes outputted by each of the multiple fan units can also be balanced.

As a skilled person in the art will appreciate, various changes and modifications can be made to the described embodiment. The embodiment is intended to include all such variations, modifications and equivalents which fall within the scope of the present invention, as defined in the accompanying claims.

What is claimed is:

1. An air conditioner, comprising:
   a housing, at least having a first air inlet and a second air inlet;
   a first throttle, arranged corresponding to a position of the first air inlet;
   a second throttle, arranged corresponding to a position of the second air inlet;

a first fan, arranged inside the housing and behind the first throttle, and the first fan outputting a first air volume;
a second fan, arranged inside the housing and behind the second throttle, and the second fan outputting a second air volume, wherein the first fan and the second fan are parallelly arranged; and
a controller, performing a parallelly operating control procedure to the first fan and the second fan, wherein the parallel operating control procedure comprises a first control mode and a second control mode, the air conditioner operates based on a first standard air volume under the first control mode, and operates based on a second standard air volume under the second control mode;
wherein, when the air conditioner operates under the first control mode, the controller adjusts a rotating speed of the first fan or the second fan to output a third air volume that is equal to or approximate to the first standard air volume;
wherein, when the air conditioner operates under the second control mode, the controller controls the first fan and the second fan to respectively output a fourth air volume according to the second standard air volume.

2. The air conditioner as claimed in claim 1, wherein the first fan comprises a first intake side, a first outtake side, a first differential pressure sensor arranged at the first intake side and the first outtake side, a first impeller, a first motor used to drive the first impeller to rotate for delivering the first air volume, and a first frequency converter used to control the rotating speed of the first motor, and the second fan comprises a second intake side, a second outtake side, a second differential pressure sensor arranged at the second intake side and the second outtake side, a second impeller, a second motor used to drive the second impeller to rotate for delivering the second air volume, and a second frequency converter used to control the rotating speed of the second motor.

3. The air conditioner as claimed in claim 2, wherein the first differential pressure sensor is configured to sense an air pressure value at the first intake side and an air pressure value at the first outtake side for generating a first air-pressure difference of the first fan, and the first frequency converter is configured to continually monitor a first rotating speed of the first motor; the second differential pressure sensor is configured to sense an air pressure value at the second intake side and an air pressure value at the second outtake side for generating a second air-pressure difference of the second fan, and the second frequency converter is configured to continually monitor a second rotating speed of the second motor.

4. The air conditioner as claimed in claim 3, wherein the controller is configured to store a performance curve table of the air conditioner, the performance curve table records corresponding curves among different air pressures, rotating speeds, and air volumes, and the controller is configured to reference the performance curve table according to the first air-pressure difference and the first rotating speed to obtain the first air volume, and to reference the performance curve table according to the second air-pressure difference and the second rotating speed to obtain the second air volume.

5. The air conditioner as claimed in claim 4, wherein, when the air conditioner is operating under the first control mode, the controller is configured to set the first air volume as the first standard air volume when the first air-pressure difference is determined smaller than the second air-pressure difference, and to adjust the rotating speed of the second fan for the second fan to output the third air volume; and the controller is configured to set the second air volume as the first standard air volume when the second air-pressure difference is determined smaller than the first air-pressure difference, and to adjust the rotating speed of the first fan for the first fan to output the third air volume.

6. The air conditioner as claimed in claim 5, wherein the controller is configured to reference the performance curve table according to the second air-pressure difference and the first standard air volume to obtain the second rotating speed which can make the second fan output the third air volume, or to reference the performance curve table according to the first air-pressure difference and the first standard air volume to obtain the first rotating speed which can make the first fan output the third air volume.

7. The air conditioner as claimed in claim 3, wherein when the air conditioner is operating under the second control mode, the controller is configured to control the first frequency converter of the first fan to adjust the first rotating speed of the first motor for the first fan to output the fourth air volume, and is configured to control the second frequency converter of the second fan to adjust the second rotating speed of the second motor for the second fan to output the fourth air volume, wherein a sum of output air volumes of the first fan and the second fan equals the second standard air volume.

8. The air conditioner as claimed in claim 7, wherein the controller is configured to store a performance curve table of the air conditioner, the performance curve table records corresponding curves among different air pressures, rotating speeds, and air volumes, and the controller is configured to reference the performance curve table according to the first air-pressure difference and the fourth air volume to obtain the first rotating speed which can make the first fan output the fourth air volume, and the controller is configured to reference the performance curve table according to the second air-pressure difference and the fourth air volume to obtain the second rotating speed which can make the second fan output the fourth air volume.

9. The air conditioner as claimed in claim 1, wherein the first control mode is a passive control mode, the second control mode is an active control mode, the controller is configured to control the air conditioner to operate under the first control mode when receiving a target temperature needed to be achieved by the air conditioner, and to control the air conditioner to operate under the second control mode when receiving a target air volume needed to be outputted by the air conditioner.

10. A method for air volume balancing of air conditioner, applied by the air conditioner as claimed in claim 1, comprising following steps:
a) determining whether the air conditioner is operating under the first control mode or the second control mode of the parallelly rotating control procedure;
b) regarding either the first air volume or the second air volume as the first standard air volume if the air conditioner is operating under the first control mode;
c) after the step b), adjusting a rotating speed of the first fan or the second fan according to the first standard air volume for the first fan or the second fan to output the third air volume, wherein the third air volume is equal to or approximate to the first standard air volume;
d) obtaining the second standard air volume pre-decided to be outputted if the air conditioner is operating under the second control mode;
e) after the step d), calculating the fourth air volume according to the second standard air volume, and controlling the first fan and the second fan to respectively output the fourth air volume; and f) continually executing the step b) to the step c), or continually executing the step d) to the step e) before the air conditioner is turned off.

11. The method as claimed in claim 10, wherein the air conditioner comprises a first differential pressure sensor used to sense a first air-pressure difference of the first fan, a second differential pressure sensor used to sense a second air-pressure difference of the second fan, a first motor used to control the rotation of the first fan, a second motor used to control the rotation of the second fan, a first frequency converter used to control a first rotating speed of the first motor, and a second frequency converter used to control a second rotating speed of the second motor, and the controller stores a performance curve table recording corresponding curves among different air pressures, rotating speeds, and air volumes.

12. The method as claimed in claim 11, wherein the step b) comprising following steps:
   b11) referencing the performance curve table according to the first air-pressure difference and the first rotating speed to obtain the first air volume;
   b12) referencing the performance curve table according to the second air-pressure difference and the second rotating speed to obtain the second air volume;
   b13) comparing the first air volume with the second air volume;
   b14) regarding the first air volume as the first standard air volume if the first air volume is larger than the second air volume; and
   b15) regarding the second air volume as the first standard air volume if the second air volume is larger than the first air volume.

13. The method as claimed in claim 11, wherein the step b) comprising following steps:
   b21) comparing the first air-pressure difference with the second air-pressure difference;
   b22) regarding the first air volume as the first standard air volume if the first air-pressure difference is smaller than the second air-pressure difference; and
   b23) regarding the second air volume as the first standard air volume if the second air-pressure difference is smaller than the first air-pressure difference.

14. The method as claimed in claim 13, wherein the step b22) is to reference the performance curve table according to the first air-pressure difference and the first rotating speed to obtain the first air volume, and the step b23) is to reference the performance curve table according to the second air-pressure difference and the second rotating speed to obtain the second air volume.

15. The method as claimed in claim 11, wherein the step c) is to control the second frequency converter to increase the second rotating speed of the second motor for the second fan to output the third air volume when regarding the first air volume as the first standard air volume, and to control the first frequency converter to increase the first rotating speed of the first motor for the first fan to output the third air volume when regarding the second air volume as the first standard air volume.

16. The method as claimed in claim 15, wherein the step c) is to reference the performance curve table according to the first air-pressure difference and the first standard air volume to obtain the first rotating speed which can make the first fan output the third air volume, or to reference the performance curve table according to the second air-pressure difference and the first standard air volume to obtain the second rotating speed which can make the second fan output the third air volume.

17. The method as claimed in claim 11, wherein the step e) is to control the first frequency converter of the first fan to adjust the first rotating speed of the first motor for the first fan to output the fourth air volume, and to control the second frequency converter of the second fan to adjust the second rotating speed of the second motor for the second fan to output the fourth air volume, wherein a sum of output air volumes of the first fan and the second fan equals the second standard air volume.

18. The method as claimed in claim 11, wherein the step e) is to reference the performance curve table according to the first air-pressure difference and the fourth air volume to obtain the first rotating speed which can make the first fan output the fourth air volume, and to reference the performance curve table according to the second air-pressure difference and the fourth air volume to obtain the second rotating speed which can make the second fan output the fourth air volume.

19. The method as claimed in claim 10, wherein the first control mode is a passive control mode, the second control mode is an active control mode, the controller in the step a) is to control the air conditioner to operate under the first control mode when receiving a target temperature needed to be achieved by the air conditioner, and to control the air conditioner to operate under the second control mode when receiving a target air volume needed to be outputted by the air conditioner.

* * * * *